UNITED STATES PATENT OFFICE.

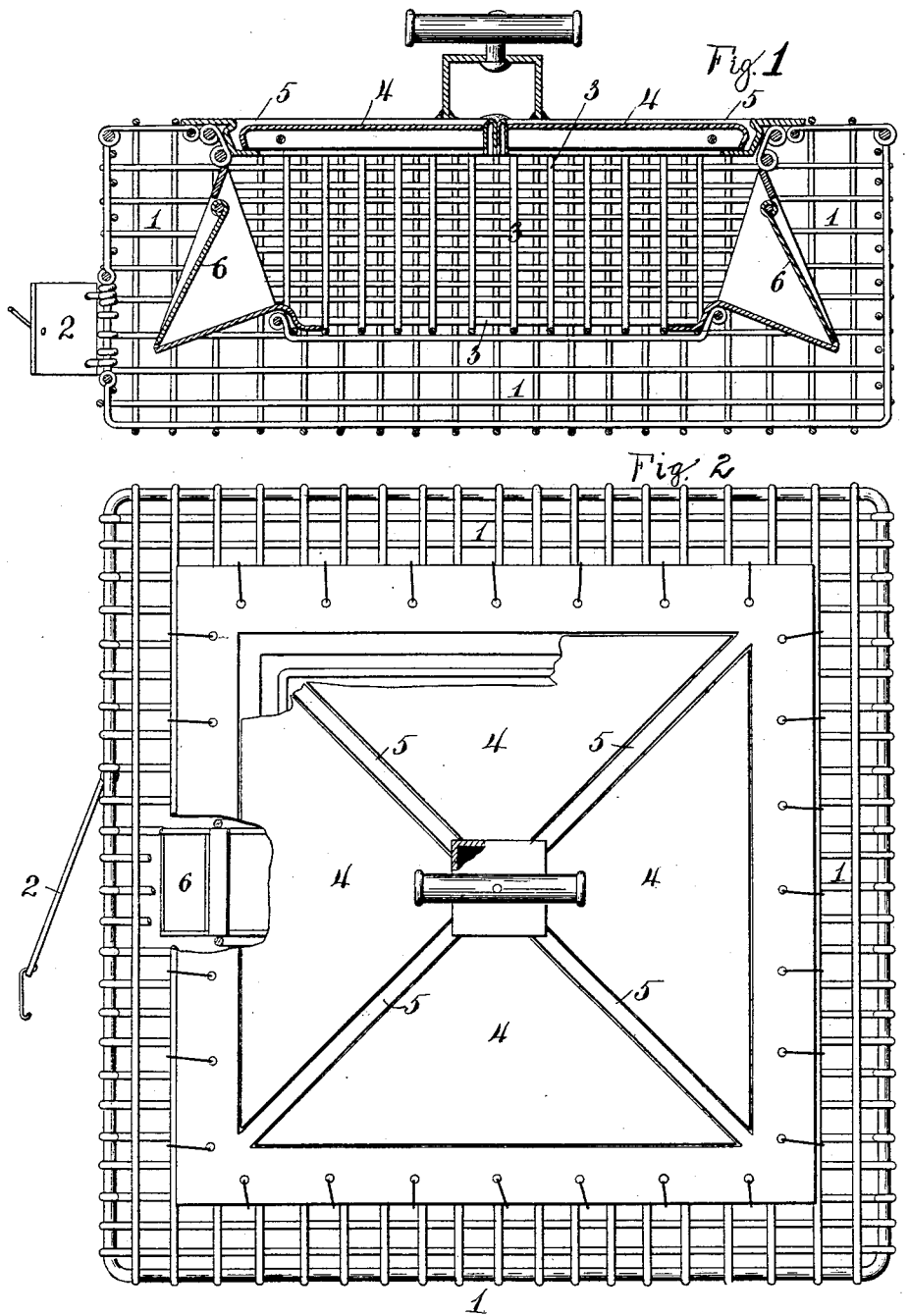

JESSE J. DREW, OF PHILADELPHIA, PENNSYLVANIA.

ANIMAL-TRAP.

SPECIFICATION forming part of Letters Patent No. 591,744, dated October 12, 1897.

Application filed January 9, 1897. Serial No. 618,586. (No model.)

*To all whom it may concern:*

Be it known that I, JESSE J. DREW, a citizen of the United States, residing at Philadelphia, in the county of Philadelphia and State of Pennsylvania, have invented certain new and useful Improvements in Animal-Traps; and I do hereby declare the following to be a full, clear, and exact description of the invention, such as will enable others skilled in the art to which it appertains to make and use the same.

This invention has reference to a novel construction in animal-traps; and it consists in the features of construction hereinafter described and claimed.

In the accompanying drawings, illustrating this invention, Figure 1 is a vertical longitudinal section of a trap constructed in accordance with this invention. Fig. 2 is a top plan view partially broken away.

Referring now to said drawings, 1 indicates an outer cage rectangular in shape and provided at one side with a door 2. The inner cage 3 is smaller than the outer cage and leaves a space between the walls of the same on the four sides and the bottom thereof. The upper end of the inner cage is flush with the upper end of the outer cage and is provided with four pivoted traps 4. These traps 4 are triangular in shape and are mounted between the cross-frames 5, extending diagonally from the corners of the top of the inner cage. The pivot between the traps and the cross-pieces is near the outer ends thereof and the trap is so balanced that they normally stand in a horizontal position, while their inner ends will drop from the weight imposed thereon by an animal. The inner cage is provided with outwardly-opening pivoted doors 6, through which an animal can pass from the inner to the outer cage.

It will be seen from the foregoing description that animals can enter the inner cage through the traps 4, which close after them and prevent their escape, except into the outer cage, through the pivoted doors 6, which also close after them and prevent them from again entering the inner cage. The trap can be made entirely of wire and tin, is always set so that any number of animals can be caught therein, and it is, furthermore, durable and inexpensive.

Having thus described my invention, what I claim as new, and desire to secure by Letters Patent, is—

1. A trap consisting of an outer cage, an inner cage supported from the top of said outer cage and extending only partially between the top and bottom of the same, inwardly-opening pivoted traps in the top of said inner cage, and outwardly-opening pivoted doors in the sides of said inner cage, substantially as described.

2. A trap consisting of an outer and inner cage, a plurality of cross-pieces extending across the top of said inner cage, inwardly-opening pivoted traps situated within said cross-pieces and outwardly-opening pivoted doors in the sides of said inner cage, substantially as described.

In testimony whereof I have signed this specification in the presence of two subscribing witnesses.

JESSE J. DREW.

Witnesses:
WM. B. DREW, Jr.,
HORACE H. STRUNK.